(12) United States Patent
Fraundorfer et al.

(10) Patent No.: US 11,338,913 B2
(45) Date of Patent: May 24, 2022

(54) AUTOGYRO ROTOR BLADE FOR GENERATING LIFT BY AUTOROTATION

(71) Applicant: Christoph Fraundorfer, Neuburg an der Donau (DE)

(72) Inventors: Christoph Fraundorfer, Neuburg an der Donau (DE); Andre Zoebisch, Burgheim (DE)

(73) Assignee: Christoph Fraundorfer, Neuburg an der Donau (DE)

( * ) Notice: Subject to any disclaimer, the term of this patent is extended or adjusted under 35 U.S.C. 154(b) by 1018 days.

(21) Appl. No.: 15/781,335

(22) PCT Filed: Dec. 2, 2016

(86) PCT No.: PCT/EP2016/079520
§ 371 (c)(1),
(2) Date: Oct. 31, 2018

(87) PCT Pub. No.: WO2017/097669
PCT Pub. Date: Jun. 15, 2017

(65) Prior Publication Data
US 2019/0152594 A1    May 23, 2019

(30) Foreign Application Priority Data

Dec. 10, 2015 (DE) ...................... 10 2015 121 502.0

(51) Int. Cl.
*B64C 27/467* (2006.01)
*B64C 27/02* (2006.01)

(52) U.S. Cl.
CPC ............ *B64C 27/467* (2013.01); *B64C 27/02* (2013.01)

(58) Field of Classification Search
CPC ......... B64C 11/16; B64C 11/18; B64C 27/02; B64C 27/023; B64C 27/46; B64C 27/467; B64C 27/473
(Continued)

(56) References Cited

U.S. PATENT DOCUMENTS 2,247,034 A    6/1941  Pitcairn
2,272,439 A *  2/1942  Stanley ................. B64C 27/473
                                                    416/226
(Continued)

FOREIGN PATENT DOCUMENTS

CN         1195327 A    10/1998
CN       103482081 A     1/2014
(Continued)

OTHER PUBLICATIONS

Russian Office Action, dated Mar. 5, 2020, 6 pages.
(Continued)

*Primary Examiner* — Justin D Seabe
*Assistant Examiner* — Julian B Getachew
(74) *Attorney, Agent, or Firm* — Dorlty & Manning, P.A.

(57) ABSTRACT

An autogyro rotor blade for generating lift by autorotation defines a root-side inner profile region, which has a first profile. The inner profile region has a tip-side main profile region, which has a second profile different from the first profile, and a profile depth curve that decreases monotonically in the longitudinal direction of the autogyro rotor blade from the region of the blade root in the direction of the blade tip. The autogyro rotor blade has a twist having a twist curve that decreases monotonically from the region of the blade root in the direction of the blade tip. The twist curve has a variable slope in the inner profile region and/or main profile region, and therefore the twist curve is concavely curved in this region.

19 Claims, 4 Drawing Sheets

(58) Field of Classification Search
USPC .................................................. 244/8, 17.11
See application file for complete search history.

(56) References Cited

U.S. PATENT DOCUMENTS

| | | | |
|---|---|---|---|
| 2,477,113 A | 2/1942 | Campbell | |
| 2,447,113 A | 8/1948 | Candy | |
| 2,917,255 A | 12/1959 | Boyd | |
| 5,332,362 A * | 7/1994 | Toulmay | B64C 27/463 |
| | | | 416/223 R |
| 5,727,754 A | 3/1998 | Carter, Jr. | |
| 6,497,385 B1 | 12/2002 | Wachpress et al. | |
| 6,641,365 B2 | 11/2003 | Karem | |
| 8,403,255 B2 | 3/2013 | Piasecki et al. | |
| 8,862,310 B2 | 10/2014 | Green et al. | |
| 9,102,419 B2 | 8/2015 | Green et al. | |
| 2002/0154996 A1 | 10/2002 | Karem | |
| 2010/0014981 A1 | 1/2010 | McGeer et al. | |
| 2010/0272576 A1 | 10/2010 | Karem | |

FOREIGN PATENT DOCUMENTS

| | | |
|---|---|---|
| DE | 502860 | 7/1930 |
| DE | 506701 | 9/1930 |
| DE | 2426689 | 12/1974 |
| DE | 3433945 | 4/1985 |
| FR | 1369600 | 8/1964 |
| GB | 452366 | 8/1936 |
| JP | 2002503593 | 2/2002 |
| JP | 2005-502540 A | 1/2005 |
| JP | 2008542110 A | 11/2008 |
| RU | 97111 | 8/2010 |
| WO | WO 99/42360 | 8/1999 |

OTHER PUBLICATIONS

Chinese Search Report dated Jan. 29, 2021, 8 pages.
Japanese Office Action dated Nov. 4, 2020, 5 pages.
German Patent Office Search Report (10 2015 121 502.0), dated Oct. 10, 2016.
English Translation of: Walter Bittner: Flugmechnik der Hubscrauber, Berlin, Heidelberg: Srpinger Verlag, 2002, 126-131—ISBN 3-540-42013-4.
Translation of the International Preliminary Report on Patentability (PCT/EP2016/079520), dated Jun. 12, 2018.
International Search Report (PCT/EP2016/079520), dated Apr. 7, 2017.
Japanese Office Action with translation, dated Nov. 4, 2020, 8 pages.

* cited by examiner

AUTOGYRO ROTOR BLADE FOR GENERATING LIFT BY AUTOROTATION

FIELD OF THE INVENTION

The present invention relates to an autogyro rotor blade for generating lift by autorotation. The autogyro rotor blade comprises a root-side inner profile region which has a first profile. In addition, the autogyro rotor blade has a main profile region which has a second profile different from the first profile.

BACKGROUND

The rotor of the autogyro, in contrast to a helicopter, is not driven, but rather is set into rotation by means of a relative wind and is referred to as autorotation. In order to generate the relative wind, the autogyro comprises a propeller which is driven by means of a motor, generates a forward motion, and is formed by the movement of the autogyro through the surrounding air of the relative wind. Since the autogyro rotor blade is not driven, there is no need for a torque-compensating tail rotor, as is the case with a helicopter. In addition, the autogyro has a high level of fail-safe operation due to the autogyro rotor in autorotation, and therefore, in the case of a failure of the propeller, the autogyro rotor is still in autorotation and a landing is similar to the landing of a glider and is relatively safe.

In order to generate the autorotation, the autogyro rotor blades of the autogyro rotor draw energy from an air volume which flows from the bottom toward the top, through the area swept by the autogyro rotor, and converts this energy into (auto)rotation and lift. In this case, it is important to note that an inner region, which is adjacent to the axis of rotation of the autogyro rotor, of the autogyro rotor blade serves to drive the autorotation, i.e., it accelerates the autogyro rotor blade. An outer region of the autogyro rotor blade, which is remote from the axis of rotation, serves to decelerate the autorotation. This outer region also generates the greatest lift, however, due to the higher rotational speed of the autogyro rotor blade. During the movement of the autogyro rotor blade, an air resistance is also induced, which is dependent on the speed of the autogyro rotor blade through the surrounding air (effective face velocity) and on the shape of the autogyro rotor blade. Higher flow velocities result in a greater air resistance. The air resistance is also dependent on the lift. The more lift a region of the autogyro rotor blade generates, the greater the air resistance is as well. Therefore, overall, the air resistance increases intensely in the direction of the blade tip of the autogyro rotor blade.

GB 452 366 A describes a rotor blade for an autogyro. A rotor blade having an essentially rectangular planform is disclosed therein. In this case, a cross-sectional profile can change along the length of the rotor blade. The disadvantage of a rotor blade of this type is that it has high air resistance.

OBJECTS AND SUMMARY OF THE INVENTION

The problem addressed by the present invention is therefore that of creating an autogyro rotor blade which has less air resistance.

The problem is solved by an autogyro rotor blade for an autogyro having the features described below.

An autogyro rotor blade for generating lift by autorotation, which comprises an inner profile region and a main profile region, is provided. Furthermore, the autogyro rotor blade preferably has a planform which tapers radially outwardly. A cross-section, in particular at a 90° angle relative to the longitudinal direction, through the autogyro rotor blade is referred to as the profile of the autogyro rotor blade. A placement of the individual profiles next to each other along a defined line and/or curve from the blade root up to the blade tip is referred to as a profile strake.

In addition, the autogyro rotor blade has a leading edge, which leads during the autorotation of the autogyro rotor, and a trailing edge which trails during the autorotation of the autogyro rotor. The leading edge and the trailing edge delimit a planform of the autogyro rotor blade. A distance between the leading edge and the trailing edge, in particular at a 90° angle relative to the longitudinal direction, is referred to as profile depth.

Furthermore, the autogyro rotor blade has a low pressure side, on which a low pressure is formed during a normal flight condition of the autogyro, and a high pressure side, on which a high pressure is formed during the normal flight condition of the autogyro. The low pressure side can be designed, in this case, as a convex surface of the autogyro rotor blade and the high pressure side can be designed as an essentially flat surface. In particular, however, the displacement effect of the approaching air is implemented via a profile of the autogyro rotor blade in such a way that, when air flows around the autogyro rotor blade, the flow on the top side of the autogyro rotor blade, namely the low pressure side, is accelerated more, on average, than on the underside of the autogyro rotor blade, namely the high pressure side. According to Bernoulli's law, a pressure distribution sets in, which corresponds to the local flow velocity, wherein the resultant pressure difference between the top side and the underside brings about the lift of the autogyro rotor blade. This results in the lift of the entire autogyro rotor and, therefore, the autogyro. This aforementioned pressure distribution is dependent on the particular profile of the autogyro rotor blade in this case. If the profile, for example, changes in such a way that the local speed of the air flow over the low pressure side becomes greater, the lift can be increased, for example. The aerodynamic properties of the autogyro rotor blade, in particular its flight performance, are therefore dependent on the profile of the autogyro rotor blade.

The autogyro rotor blade also comprises a root-side inner profile region which has a first profile. This first profile can also extend, for example, along the entire length of the inner profile region. In addition, the autogyro rotor blade has a tip-side main profile region which has a second profile different from the first profile. This second profile can also extend, for example, along the entire length of the main profile region. Different flows onto the autogyro rotor blade can be addressed by means of at least two different profiles of the autogyro rotor blade.

In addition, the autogyro rotor blade has an inner profile region at the blade root and/or adjacent thereto, an outer profile region at the blade tip and/or adjacent thereto, and/or a main profile region between the blade root and the blade tip. Therefore, the inner profile region, the main profile region, and the outer profile region are arranged in succession from the blade root up to the blade tip. In this case, the inner profile region, the outer profile region, and/or the main profile region each have an, in particular, different profile. In addition, as described above, the flow velocity of the surrounding air increases around a region of the autogyro rotor blade. Due to the three regions, flow velocities which are different along the autogyro rotor blade can be addressed.

Moreover, the autogyro rotor blade has a profile depth curve which decreases monotonically in the longitudinal direction of the autogyro rotor blade from the region of the blade root in the direction of the blade tip. In this case, the profile depth curve first decreases starting at a maximum profile depth. A region between the end of the autogyro rotor blade at the blade root up to the point of the maximum profile depth merely comprises securing means, with the aid of which the autogyro rotor blade is mounted on an autogyro rotor head and, therefore, has no significant effects on the flight performance.

The profile depth curve, in this case, is the profile depth depending on the longitudinal direction of the autogyro rotor blade from the region of the blade root in the direction of the blade tip. The profile depth curve can therefore be represented, for example, as a graph, a function, a mapping, or a relation in a Cartesian coordinate system. In this case, the longitudinal direction from the blade root to the blade tip is plotted on the x-axis. For example, x=0 can be selected in the region of the blade root, in particular at the maximum profile depth of the autogyro rotor blade. The longitudinal direction of the autogyro rotor blade is then plotted in the direction of positive x-values. The profile depths can be plotted, for example, as y-values. The profile depth curve is then the function of the profile depth depending on the x-values or the longitudinal direction. The profile depth curve is therefore a graph or a diagram in the Cartesian coordinate system, and therefore the profile depth of the autogyro rotor blade can be read off at any points, for example, at certain distances from the blade root in the direction of the blade tip.

A monotonically decreasing profile depth curve therefore describes an autogyro rotor blade, the profile depth of which monotonically decreases from the blade root, in particular from a maximum profile depth, in the direction of the blade tip.

The profile depth can decrease, in this case, linearly, parabolically, and/or exponentially from the blade root up to the blade tip. Additionally or alternatively, the trailing edge, in particular, can also have a convex and/or concave shape with respect to the autogyro rotor blade.

Since the autogyro rotor blade rotates about an axis of rotation of the autogyro rotor, the autogyro rotor blade has different rotational speeds, depending on the radius. A flow velocity of the surrounding air around a region of the autogyro rotor blade is a superposition of relative wind and the rotational speed of the region of the autogyro rotor blade. The flow velocity of the air flowing against the autogyro rotor blade therefore increases with the radius. The flow velocity is lowest at the blade root and is highest at a blade tip in this case. In addition, the superposition of relative wind and rotational speed results in different angles of incidence along the autogyro rotor blade, at which flow impinges the autogyro rotor blade.

In the case of a non-twisted autogyro rotor blade having a constant profile depth curve (rectangular blade), this rotor blade is not adapted to the locally different incident flow. In this case, the flow around the autogyro rotor blade brings about a downwash, at every position, according to the local flow conditions. A corresponding downwash field therefore sets in for the entire autogyro rotor blade or the entire autogyro rotor. In the case of non-twisted rectangular blades, this induced downwash field is unfavorable, whereby the ability of the autogyro rotor to spin freely is diminished and results in a corresponding air resistance of the autogyro rotor.

When the profile depth decreases in the direction of the blade tip, this results—together with the local incident flow on the rotor blade—in a more advantageous downwash distribution which brings about an increased ability of the autogyro rotor to spin freely and, therefore, reduces the air resistance of the entire autogyro rotor. Due to the monotonically decreasing profile depth in the direction of the blade tip, a different type of distribution of the lift forces on the autogyro rotor blade occurs. In this case, the profile depth curve is designed in such a way that the planform of the autogyro rotor blade according to the invention, having the optimized downwash field together with the (outwardly) increasing face velocity, provides the same lift, on average, as in the case of an autogyro rotor blade having a constant profile depth curve, although with less resistance.

In this case, a greater flight performance can be achieved with an autogyro rotor blade which has less air resistance. For example, a flight duration and, therefore, a range of the autogyro can be extended.

According to the invention, the autogyro rotor blade has a twist having a twist curve which decreases monotonically from the region of the blade root in the direction of the blade tip. The twist curve can be described similarly to the profile depth curve in this case. For example, as a function, a diagram, or a graph of the twist of the autogyro rotor blade depending on the longitudinal direction from the blade root in the direction of the blade tip. The distance or the longitudinal direction is plotted on the x-axis again, wherein the region of the blade root is at x=0 and the blade tip assumes the greatest (positive) x-value. The twist is then plotted on the y-axis. On the basis of the graph, the twist of the autogyro rotor blade can therefore be read off at different points of the autogyro rotor blade. The twist curve also indicates how the autogyro rotor blade is twisted. The twist also indicates an angle. The twist with a pitch angle of the autogyro rotor blade indicates how a profile is oriented with respect to a plane of rotation of the rotating autogyro rotor blade.

The plane of rotation is defined to be perpendicular to the axis of rotation of the autogyro rotor (flapping and hunting of the autogyro rotor blade are not taken into account). If the autogyro rotor blade has a pitch angle, the autogyro rotor blade is rotated, by an angle, about the longitudinal axis which extends in the span direction (from the blade root to the blade tip). The pitch angle is the angle between a rotor blade-fixed, defined reference plane and the plane of rotation.

The twist itself indicates the angle at which the local profile section is twisted with respect to a reference plane. The pitch angle forms, with the twist, the local geometric angle of attack. This is locally different, due to the twist, and is therefore defined as the angle between the chord and the plane of rotation. The chord is the connecting line between the points of the leading edge and the trailing edge of the profile that lie farthest apart from each other.

Given a pitch angle of zero degrees, the twist angle of a profile is that angle which forms a profile with the plane of rotation of the rotating autogyro rotor blade. This twist angle is, for example, zero degrees (for a profile under consideration), when the profile is aligned in parallel to the plane of rotation (at a pitch angle of zero degrees).

Furthermore, the autogyro rotor blade has a twist in the longitudinal direction, and therefore the autogyro rotor blade is rotated about an axis in the longitudinal direction. When the individual profiles in a profile strake are lined up in a row, each at a different angle, the twist is formed. By means of the twist, a behavior of flow against the autogyro rotor blade can be changed. Therefore, a more advantageous downwash distribution can be achieved, and therefore a performance of the autogyro rotor blade can be increased while the air resistance remains the same. Due to the twist, the geometric angle of attack of the individual profiles with respect to a plane of rotation of the autogyro rotor blades of the autogyro rotor is different across the longitudinal direction of the autogyro rotor blade. If the twist angle is small, for example, the associated profile is essentially parallel to the pitch angle or, at a pitch angle of zero degrees, is essentially parallel to the plane of rotation of the autogyro rotor blades.

Similarly to the depth distribution, the twist also has substantial influence on the local flow conditions which, in turn, influences the local downwash and, therefore, contributes to the total downwash field/essentially co-determines the total downwash field.

A twist according to the invention results in a more favorable downwash field, whereby the ability of the rotor to spin freely is further increased and the air resistance of the entire autogyro rotor is further reduced. In this case, the twist is designed in such a way that the twist not only results in an improvement on the downwash field, but rather the downwash field which results is designed/formed in such a way that flow against the autogyro rotor blade is optimal, corresponding to the locally utilized profiles, whereby the blade profiles further increase the ability of the rotor to spin freely and can therefore make a further contribution to the reduction in the overall air resistance of the autogyro rotor.

It is also advantageous when the twist in the longitudinal direction from the blade root up to the blade tip is designed in such a way that the trailing edge is twisted in the direction of the low pressure side and the leading edge is twisted in the direction of the high pressure side. During a normal flight operation, the autogyro rotor blade has a pitch angle, i.e., the leading edge is situated higher than the trailing edge, and therefore the chord (the connecting line between the leading edge and the trailing edge) has the geometric angle of attack. This means, the autogyro rotor blade is tilted upward with respect to the plane of rotation.

Since the flow velocity in the root region is less than in the tip region, it is advantageous when, due to the twist in the root region, the pitch angle of the profiles is increased and is reduced in the tip region or toward the tip region. This improves the downwash distribution, whereby the air resistance of the autogyro rotor is reduced. The performance of the autogyro rotor blade is increased as a result.

Furthermore, the twist curve has a variable slope in the inner profile region and/or in the main profile region. In this case, the twist curve can be concavely curved in this region. The twist curve therefore changes across the length of the autogyro rotor blade, which is advantageous for the flight performance of the autogyro rotor blade. Since the flow against the autogyro rotor blade is different along its length during a flight of the autogyro, it is advantageous when the twist is also adapted to these different air flows. When the twist curve is designed to be concavely curved and monotonically decreasing, the twist curve approaches the x-axis, i.e., the twist angle approaches zero degrees in the direction of the blade tip. A profile on the blade tip is therefore parallel to the plane of rotation of the rotating autogyro rotor blade (at a pitch angle of zero degrees). The flight performance of the autogyro rotor blade is therefore improved, since turbulence in the direction of the blade tip is reduced. The autogyro rotor blade can be adapted to special requirements of the autogyro with the aid of a particular shape, profile, twist, and/or planform. If, for example, the range of the autogyro is to be increased (while the tank of fuel, etc. remains the same) or a greater payload is to be transported, the profile depth curve according to the invention can be scaled by a factor which, for example, decreases or increases the profile depth. For example, the factor could be 0.8, and therefore the profile depth is reduced by this factor. The autogyro rotor blade is therefore designed to be narrower overall. Alternatively, the factor could also be 1.2, and therefore the profile depth is increased by this factor. The autogyro rotor blade is therefore wider by this factor. The factor could also be in a range between 0.8 and 1.2. The factor could also be variable across the length of the autogyro rotor blade. In this way, for example, the inner profile region and the main profile region could have a different factor. Therefore, the profile depth curve can be ideally adapted to the design objectives. Furthermore, the profile depth curve can be optimally adapted to different rotor diameters. When, for example, the planform of the autogyro rotor blade has a larger area, the lift is increased, and therefore the autogyro rotor blade can carry higher loads. In this case, the planform according to the invention always forms the basis for an optimized downwash field, which ultimately results in a reduction in the resistance of the autogyro rotor. All this increases the flight performance of the autogyro rotor blade, which is achieved with the autogyro rotor blade according to the invention.

It is also advantageous when the main profile region extends across a greater length than the inner profile region. Since the rotational speed of the autogyro rotor blade in the main profile region is higher than in the inner profile region, the main profile region has greater effects on the flight performance of the autogyro rotor blade. An adaptation of a larger main profile region can be designed to be more effective in this case.

In one advantageous refinement of the invention, a transition profile region is situated between the inner profile region and the main profile region. Additionally or alternatively, the transition profile region can include a third profile. The profile geometry of the transition profile region changes in this case preferably continuously and/or flowingly radially outwardly from the first profile to the second profile. Therefore, for example, a continuous and/or flowing transition from a first and a second profile—which are different from each other—can be formed. Therefore, discontinuities, for example, edges and/or steps, between the first and the second profiles can be avoided, which enables a continuous transition of the aerodynamic properties and, therefore, increases the flight performance of the autogyro rotor blade. In addition, more than one transition profile region could also be situated between the inner profile region and the main profile region. These multiple transition profile regions could also each have a profile, wherein at least two profiles are different.

Additionally or alternatively, a second transition profile region can also be situated between the main profile region and the outer profile region. Therefore, the flow conditions of the air around the autogyro rotor blade can be better addressed. In addition, more than one second transition profile region could also be situated between the main profile region and the outer profile region. These multiple transition profile regions could also each have a profile, wherein at least two profiles are different.

It is also advantageous when a projection is situated in the region of the trailing edge, and therefore the autogyro rotor blade is curved in the direction of the low pressure side and/or the low pressure side and the high pressure side are essentially parallel in the region of the projection. With the aid of the projection, which is curved in the direction of the low pressure side, in particular, the air flow detaching from the autogyro rotor blade can be better guided behind the trailing edge of the autogyro rotor blade, whereby torsional loads can be reduced.

In addition, it is advantageous when the twist curve has a constant slope in the transition profile region, and therefore the twist curve is straight, in particular across the entire transition profile region. This allows for a continuous transition of the aerodynamic properties.

It is also advantageous when the twist, in particular the twist angle, is constant in the longitudinal direction in the first and/or the second transition profile region. This simplifies the design of the autogyro rotor blade. Additionally or alternatively, the twist in the first and/or in the second transition profile region can be greater than in the inner profile region and/or in the main profile region. Therefore, a twist between the profile regions can be compensated for or adapted to each other, for example, across a short distance in the longitudinal direction of the autogyro rotor blade.

It is also advantageous when the slope and/or the overall twist of the transition profile region is at least half as great as the maximum slope and/or overall twist of the inner profile region and/or main profile region. As a result, the first and the second profiles can be adapted to each other across a shorter length of the autogyro rotor blade.

In this case, the twist can change linearly from the blade root to the blade tip in the way described above, which is advantageous, since the flow velocity of the air around the autogyro rotor blade also increases linearly, radially outwardly, with the radius. The twist could also have a parabolic, exponential, polynomial, and/or logarithmic course from the blade root up to the blade tip. In addition, the twist can be different in each region, in particular the transition profile regions, the inner profile region, the main profile region, and/or the outer profile region. In addition, at least one of the aforementioned regions could have no twist. As a result, the twist can be optimally adapted to the flow conditions in these regions.

When the twist is designed to be variable in the inner profile region, in the main profile region, and/or in the outer profile region, this also offers advantages. Therefore, the flow conditions, in particular the flow velocity increasing with the radius, can be particularly advantageously addressed, which reduces the air resistance and, therefore, increases the flight performance.

It is also advantageous when the autogyro rotor blade preferably has only a small twist angle in the region of the blade tip, in particular the outer profile region. By means of the outer profile region, the autogyro rotor blade can be better adapted to the flow conditions. When the twist angle is constant, for example, the autogyro rotor blade is not twisted in the outer profile region, which results in a simpler manufacture of the autogyro rotor blade.

Furthermore, it is advantageous when the twist curve has a positive twist angle in the entire inner profile region and/or in the transition region or in the transition regions. As described above, the twist angle indicates the degree by which the local profile section is twisted with respect to a defined reference plane. At a pitch angle of zero degrees, the twist angle of a profile is that angle which a profile forms with the plane of rotation of the rotating autogyro rotor blade. At a positive twist angle, the autogyro rotor blade is tilted upward, which means that the leading edge of the autogyro rotor blade has a greater distance to the plane of rotation than the trailing edge.

In addition, it is advantageous when the twist curve has a positive twist angle in a root-side first subregion of the main profile region and has a negative twist angle in a tip-side second subregion of the main profile region. Additionally or alternatively, the twist angle between the first and the second subregions is zero. For example, in this region, the profile is parallel to the plane of rotation at a pitch angle of zero. All this increases the flight performance of the autogyro rotor blade.

It is also advantageous when the twist curve has a first sharp bend during the transition from the inner profile region to the transition profile region. Additionally or alternatively, it is advantageous when the twist curve has a second sharp bend during the transition from the transition profile region to the main profile region. In this case, the first and/or the second sharp bend can be designed, for example, to be negative and/or convex.

It is also advantageous when the profile depth curve is designed as a sweeping curve, for example, in the transition profile region and/or in the main profile region. Additionally or alternatively, the profile depth curve can be designed as a monotonically decreasing curve. The monotonically decreasing curve can also be a strictly monotonically decreasing curve.

Moreover, it is advantageous when the inner profile region has a relative profile thickness, which indicates the ratio of greatest profile thickness and the profile depth, between 11% and 15%, preferably 13.5%, with a relative thickness setback, which indicates the ratio of the distance of the greatest profile thickness from the leading edge and the profile depth, between 25% and 35%, preferably 29.2%. The profile thickness in this case is the vertical distance between the high pressure side and the low pressure side.

It is also advantageous when the main profile region has a relative profile thickness, which indicates the ratio of greatest profile thickness and the profile depth, between 10% and 14%, preferably 12.1%, with a relative thickness setback, which indicates the ratio of the distance of the greatest profile thickness from the leading edge and the profile depth, between 26% and 36%, preferably 31.1%.

It is advantageous when the inner profile region has a maximum curvature, which indicates the ratio of the greatest distance between the chord to the camber line and the profile depth, between 3% and 4%, in particular between 3.6% and 3.8%, with a relative curvature setback, which indicates the ratio between the distance of the maximum curvature from the leading edge and the profile depth, between 30% and 40%, preferably 35.3%. The chord is the connecting line from the leading edge to the trailing edge in this case. The camber line is the line which extends in the middle between the low pressure side and the high pressure side.

It is advantageous when the main profile region has a maximum curvature, which indicates the ratio of the greatest distance between the chord to the camber line and the profile depth, between 3% and 4%, in particular between 3.2% and 3.4%, with a relative curvature setback, which indicates the ratio between the distance of the maximum curvature from the leading edge and the profile depth, between 30% and 40%, preferably 36.8%.

It is also advantageous when the cross-sectional profile of the inner profile region is formed utilizing coordinates normalized to 1 according to the following table 1.

TABLE 1

| X/c | Y/c |
| --- | --- |
| 0.9999143 | 0.0013778 |
| 0.9096047 | 0.0057740 |
| 0.8094283 | 0.0215009 |
| 0.7018852 | 0.0380422 |
| 0.5942588 | 0.0547910 |
| 0.5069711 | 0.0676497 |
| 0.4086232 | 0.0790094 |
| 0.3009582 | 0.0828136 |
| 0.1957930 | 0.0751251 |
| 0.1002021 | 0.0572140 |
| 0.0000021 | −0.0001393 |
| 0.0993147 | −0.0268982 |
| 0.2099724 | −0.0272236 |
| 0.2992137 | −0.0251922 |
| 0.4082850 | −0.0217272 |
| 0.4999015 | −0.0184438 |
| 0.5916794 | −0.0151009 |
| 0.7018578 | −0.0112716 |
| 0.7933965 | −0.0082416 |
| 0.9019589 | −0.0051074 |
| 1.0000250 | −0.0013522 |

The X/c and the Y/c values are normalized to the profile depth (c in the divisor of the values). The coordinate origin is at the leading edge and the values are arranged in the table, from top to bottom, in such a way that, starting from the trailing edge, described first is along the low pressure side to the leading edge and, subsequently, along the high pressure side back again to the trailing edge.

It is also advantageous when the cross-sectional profile of the main profile region is formed utilizing coordinates normalized to 1 according to the following table 2.

TABLE 2

| X/c | Y/c |
| --- | --- |
| 0.9999143 | 0.0015200 |
| 0.9084306 | 0.0066846 |
| 0.7988078 | 0.0244418 |
| 0.7023305 | 0.0398598 |
| 0.6058425 | 0.0553892 |
| 0.4954016 | 0.0718163 |
| 0.4047419 | 0.0813044 |
| 0.3017767 | 0.0832083 |
| 0.1994129 | 0.0743986 |
| 0.1020109 | 0.0551867 |
| 0.0000031 | −0.0001814 |
| 0.0957733 | −0.0261818 |
| 0.2031406 | −0.0278629 |
| 0.2994944 | −0.0263669 |
| 0.3968387 | −0.0235516 |
| 0.4948608 | −0.0200729 |
| 0.6096461 | −0.0157994 |
| 0.7080685 | −0.0121285 |
| 0.8063514 | −0.0085282 |
| 0.9045046 | −0.0051214 |
| 1.0000250 | −0.0014784 |

The X/c values and the Y/c values are normalized to the profile depth (c in the divisor of the values). The coordinate origin is at the leading edge and the values are arranged in the table, from top to bottom, in such a way that, starting from the trailing edge, described first is along the low pressure side to the leading edge and, subsequently, along the high pressure side back again to the trailing edge.

Furthermore, the Y/c values from table 1 can be provided with a factor of 0.7 to 1.1, preferably 0.8, and/or the Y/c values from table 2 can be provided with a factor of 0.7 to 1.1, preferably 0.9. The two tables, in particular the Y/c values, can therefore be scaled by these factors.

By means of profiles of the regions (inner profile region, main profile region, and/or outer profile region) of the autogyro rotor blade designed in this way, the autogyro rotor blade can be optimally adapted to requirements on a flight behavior of the autogyro rotor. When, for example, a higher airspeed is required, the relative profile thickness, for example, can be selected to be smaller, whereby the transonic effects occurring at higher airspeeds are thwarted, which results not only in a reduced air resistance of the autogyro rotor, but also in a corresponding reduction in noise.

BRIEF DESCRIPTION OF THE DRAWINGS

Further advantages of the invention are described in the following exemplary embodiments. Wherein.

DETAILED DESCRIPTION

Figure 1:
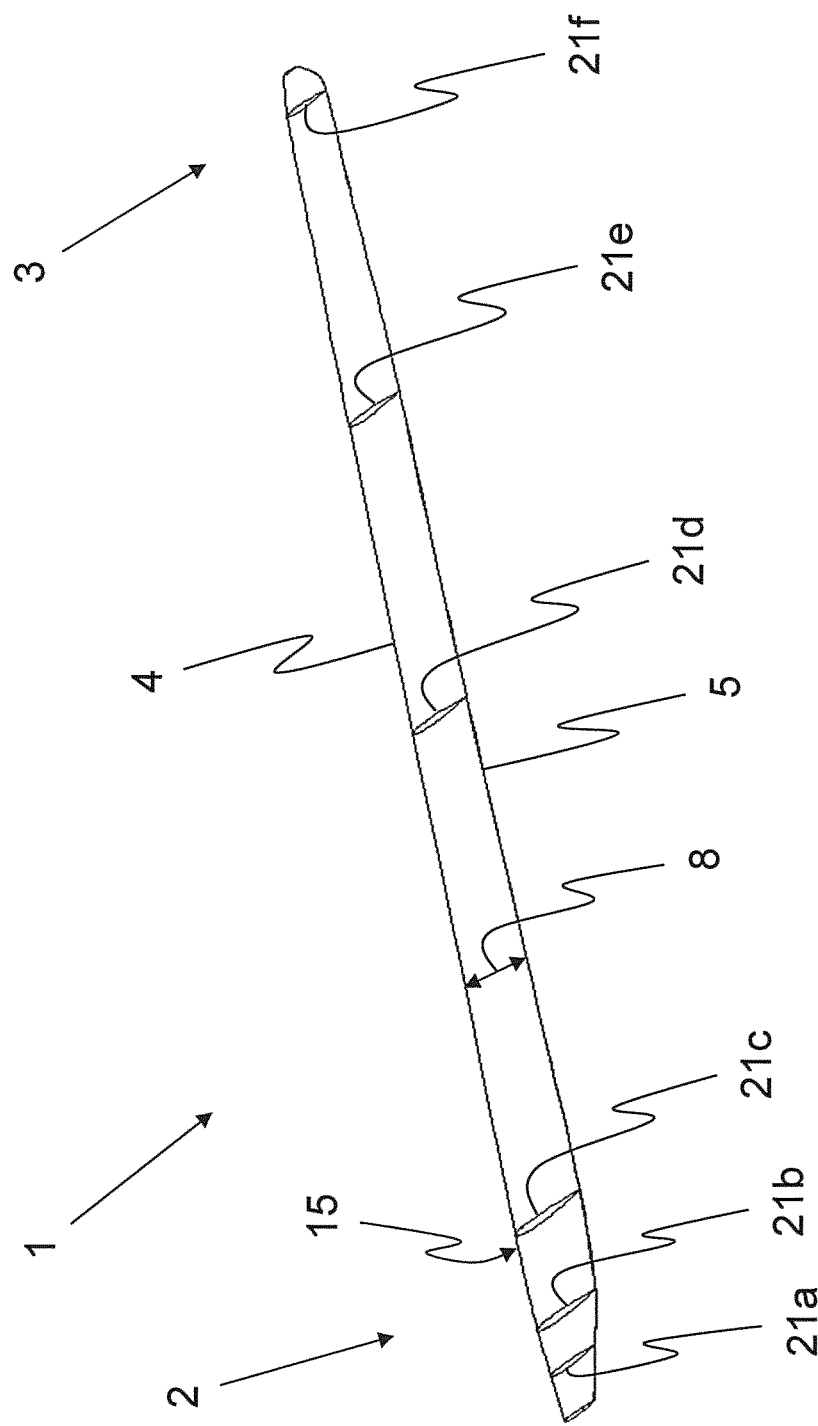
FIG. 1 shows a perspective view of an autogyro rotor blade.

FIG. 1 shows a perspective view of an autogyro rotor blade 1. The autogyro rotor blade extends along a longitudinal direction from a blade root 2 up to a blade tip 3, which are situated at the respective ends of the autogyro rotor blade 1. In the region of the blade root 2, the autogyro rotor blade 1 can be secured on a rotor head of an autogyro. The autogyro rotor blade 1 therefore rotates about the rotor head during a flight operation of the autogyro, wherein the blade root 2 lies inward and the blade tip 3 lies outward during rotation. The blade tip 3 therefore has a higher circumferential speed than, for example, a region farther inward in the direction of the blade root 2. A superposition of the circumferential speed of the autogyro rotor blade 1 and a relative wind results in the flow velocity of the air against the autogyro rotor blade 1. For example, in the case of the forward-moving autogyro rotor blade 1, the flow velocity is greater toward the outside.

Furthermore, the autogyro rotor blade 1 comprises a leading edge 4 which leads during the flight operation of the autogyro, and a trailing edge 5 which trails during the flight operation of the autogyro. The leading edge 4 and the trailing edge 5 outline the autogyro rotor blade 1, and therefore their outlines form a planform of the autogyro rotor blade 1 (cf. FIG. 2).

A section, in particular a 90° section, transverse to the longitudinal direction designates a profile 21a-f of the autogyro rotor blade 1. The respective profiles 21a-f can change across the longitudinal direction of the autogyro rotor blade 1, and therefore the respective profiles 21a-f differ. In addition, the profiles 21a-f can change continuously, for example, wherein, for example, the first profile 21c transitions continuously and constantly into the third profile 21d. Moreover, the autogyro rotor blade 1 can also have considerably more different profiles 21. For example, the autogyro rotor blade 1 can have yet another, in particular, different profile 21 between the first profile 21c and the third profile 21d.

The profiles 21a-f in the different regions of the autogyro rotor blade 1 determine, in this case, the properties of the autogyro rotor blade 1, such as the lift and the air resistance.

Figure 2:
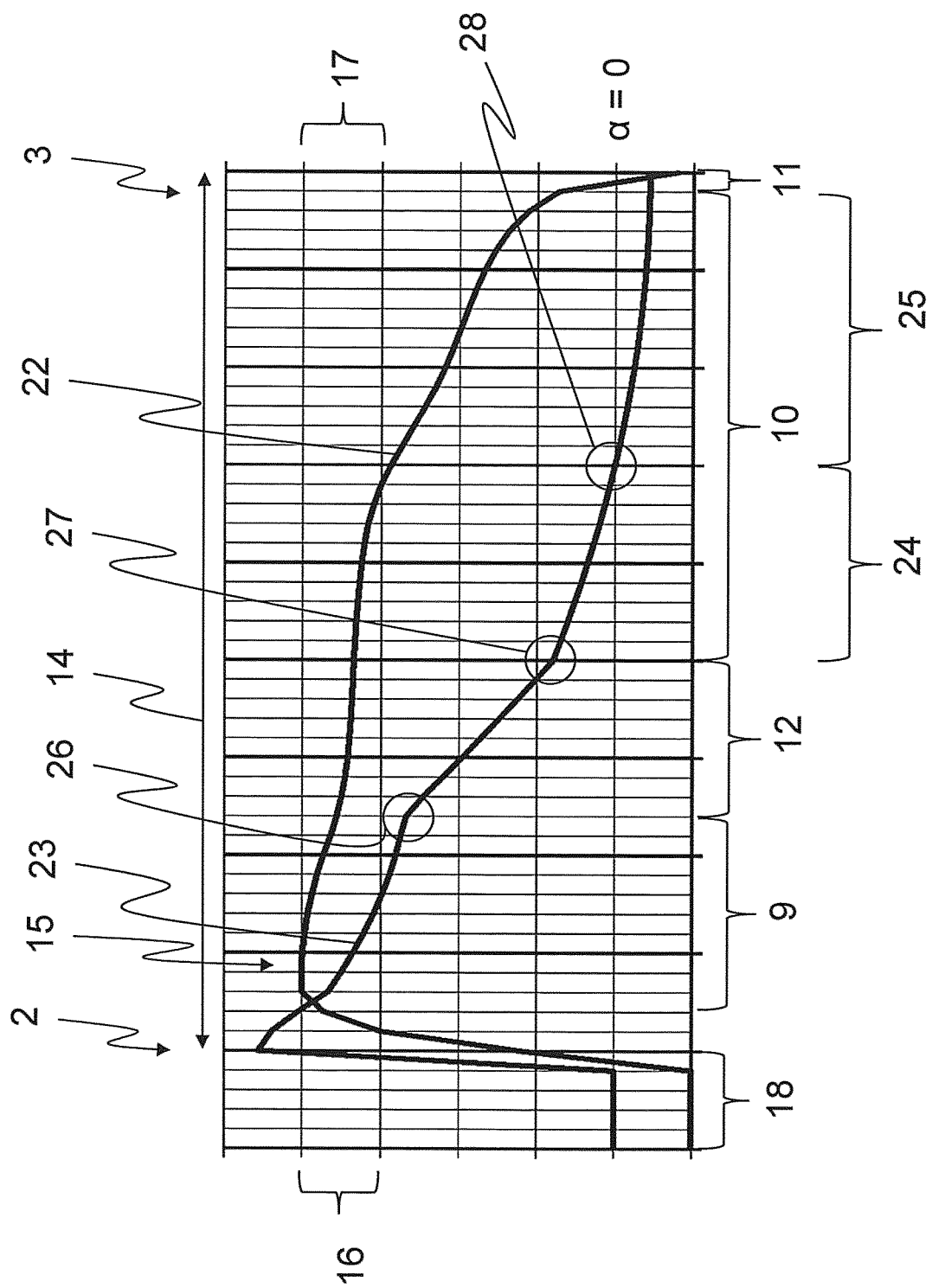
FIG. 2 shows a diagram of a profile depth curve and a twist curve of an autogyro rotor blade.
Figure 3:
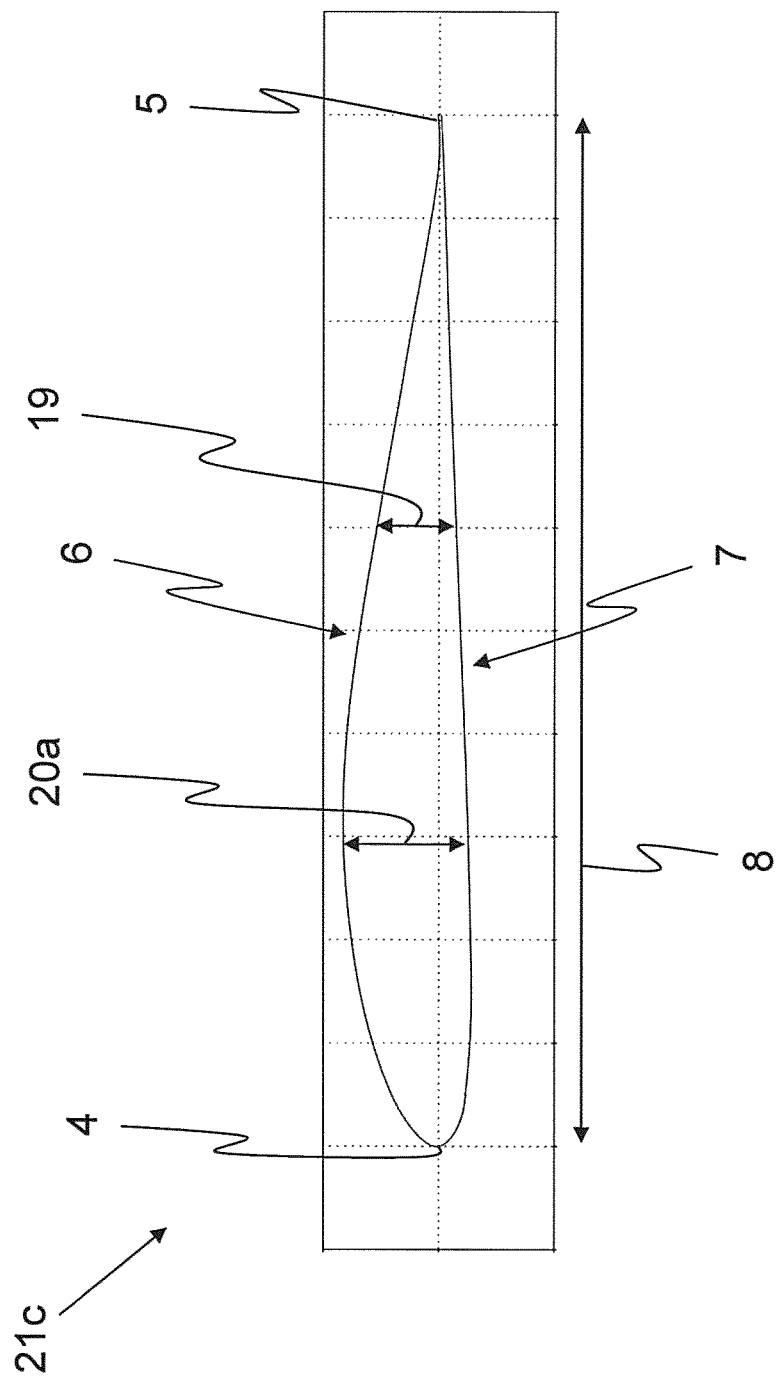
FIG. 3 shows a cross-section of the profile of the inner profile region.

The first profile 21c is the cross-section of an inner profile region 9 (cf. FIGS. 2 and 3). The second profile 21e is the cross-section of a main profile region 10 (cf. FIGS. 2 and 4).

In addition, a distance between the leading edge 4 and the trailing edge 5 is designated as the profile depth 8. According to the invention, the profile depth 8 decreases monotonically from a region of a maximum profile depth 15 in the direction of the blade tip 3. Additionally or alternatively, the profile depth 8 can also be designed to be constant across one region of the autogyro rotor blade 1. The profile depth 8 can also influence the properties of the autogyro rotor blade 1. For example, a suitable profile depth curve brings about a more favorable downwash field, which ultimately brings about a lower resistance of the autogyro rotor.

The requirements of the autogyro can therefore be addressed with the aid of an outwardly tapering autogyro rotor blade 1 and special shapes of the profiles 21a-f. When the autogyro is to transport greater loads, for example, the profile depth curve can be scaled by a factor which, for example, increases the local profile depth, and therefore a lift is increased. This factor can be the same for each region of the autogyro rotor blade. Additionally or alternatively, the individual regions, for example, the inner profile region, the main profile region, the outer profile region, and/or the at least one transition profile region could have different factors. At least two factors are different in this case. In addition, profiles 21a-f having a greater lift can be formed. On the other hand, if the autogyro is to be utilized for sports purposes, the profile depth curve can be reduced by a factor which, for example, reduces the local profile depth, and therefore the profile depth curve can be ideally adapted to each autogyro rotor radius and, in this way, the air resistance is reduced and, as a result, a higher flight speed can be achieved with the autogyro. Therefore, the flight performance of the autogyro rotor blade 1 can be increased overall and adapted to the requirements of the autogyro.

A distance transverse to the longitudinal direction, in particular 90° with respect to the longitudinal direction, of the autogyro rotor blade 1 between the leading edge 4 and the trailing edge 5 is referred to as the profile depth 8. The profile depth 8 decreases from a region of a maximum profile depth 15 in the direction of the blade tip 3. With the aid of a decreasing profile depth 8, a more favorable downwash field can be generated, whereby less turbulence forms and the air resistance decreases. As the profile depth 8 decreases toward the outside, the air resistance of the autogyro rotor is reduced, which is advantageous for a flight performance of the autogyro.

FIG. 2 shows a diagram of a profile depth curve 22 and a twist curve 23 of an autogyro rotor blade 1. The longitudinal extent 14 of the autogyro rotor blade 1 is plotted on the horizontal or the x-axis. In this case, the blade root 2 is situated on the left side and the blade tip 3 is situated on the right side of the x-axis. The autogyro rotor blade 1 therefore extends in a positive coordinate direction from the blade root 2 to the blade tip 3. Plotted on the vertical or the y-axis are, on one side, the profile depth 8 and, on the other side, the twist 13 of the autogyro rotor blade 1 or the twist angle α. The two graphs therefore represent the profile depth curve 22 and the twist curve 23.

Moreover, the autogyro rotor blade 1 is divided into different profile regions 9, 10, 11, 12. An inner profile region 9 is situated at the blade root 2 and/or adjacent thereto. An outer profile region 11 is situated on the blade tip 3 and/or adjacent thereto. A main profile region 10 is situated between these profile regions 9, 11. The three profile regions 9, 10, 11 can have different profiles in this case. A profile is a section in this case, in particular, a 90° section, with respect to the longitudinal direction of the autogyro rotor blade 1. For example, the inner profile region 9 could have a profile, in particular, the first profile 21c from FIG. 1, according to the table 1 contained in the preceding description, or according to FIG. 3. The main profile region 10 could have, for example, a profile, in particular, the second profile 21e from FIG. 1, according to the table 2 contained in the preceding description or according to FIG. 4.

In addition, a transition profile region 12 is situated between the inner profile region 9 and the main profile region 10. Additionally, a second transition profile region can also be situated between the main profile region 10 and the outer profile region 11. In particular, the inner profile region 9 and the main profile region 10 have different profiles 21c, 21e. A transition can be formed between the different profiles by means of the transition profile region 12.

In the case of the autogyro rotor blade 1, a twist 13 is a twisting of the autogyro rotor blade about an axis in the longitudinal direction. The leading edge 4 and the trailing edge 5 (cf. FIG. 1) describe, in the case of a twist 13, a helix about the axis in the longitudinal direction. In particular, from the blade root 2 up to the blade tip 3, the leading edge 4 is twisted in the direction of the high pressure side 7 and the trailing edge 5 is twisted in the direction of the low pressure side 6 (cf. FIGS. 3, 4 for the high pressure side 7 and the low pressure side 6). During a normal flight operation of the autogyro, the autogyro rotor blade 1 therefore has a greater angle with respect to a plane of rotation of the autogyro rotor at the blade root 2 than at the blade tip 3. This greater angle at the blade root 2 is also a reflection of the fact that the leading edge 4 has a greater distance to this plane of rotation than the trailing edge 5. At the blade tip 3, this difference in the distances of the leading edge 4 or the trailing edge 5 to the plane of rotation is less due to the twist 13. This results in a lower air resistance of the autogyro rotor blade 1.

Moreover, for example, one section on the left y-axis 16, which indicates the profile depth 8 of the autogyro rotor blade 1, could be 20% of the maximum profile depth. Therefore, the left y-axis would extend across 120% (from 0% to 120%). One section of the right y-axis 17, which indicates the twist 13, could be 1°, for example. In addition, the right y-axis could extend from −1° to 5°. One section on the x-axis 18 could be 10% of the longitudinal extent 14. Therefore, the autogyro rotor blade 1 extends from 0% to 100% of the longitudinal extent 14 and, therefore, is normalized with respect to the longitudinal extent 14.

In this case, it is important to note that the region upstream from the inner profile region 9 from 0% to 16% still belongs to the autogyro rotor blade 1, but the securing means, for example, are situated here and form a transition to the inner profile region. This is why the profile depth curve 22 and the twist curve 23 have a constant value and increase rapidly during the transition to the inner profile region 9. This region is to be excepted from a consideration of the function of the autogyro rotor blade 1, however. The longitudinal extent 14 and the consideration of the function of the autogyro rotor blade 1 therefore begin first at 16% and end at 100%.

Furthermore, the autogyro rotor blade 1 is divided into different profile regions 9, 10, 11, 12. The inner profile region 9 is situated at the blade root 2 and/or adjacent thereto. The transition profile region 12 is situated subsequent thereto. The main profile region 10 is also situated subsequent thereto. Finally, the autogyro rotor blade 1 includes the outer profile region 11. Additionally or alternatively, a second transition profile region can be situated between the main profile region 10 and the outer profile region 11.

In this exemplary embodiment, the inner profile region 9 extends across a region from 16% up to 34% of the longitudinal extent of the autogyro rotor blade 1. The profile depth 8 can be read, for example, from the profile depth curve 22 for the inner profile region 9, and has values, for example, of approximately 100% to 90% of the maximum profile depth. The distance between the leading edge 4 and the trailing edge 5 therefore has these values of the maximum profile depth in this region. The profile depth curve 22 decreases monotonically starting at a region of the maximum profile depth 15 of the autogyro rotor blade 1. Additionally or alternatively, the profile depth curve 22 can also be designed to be constant across one region of the longitudinal extent 14. A twist curve 23 also decreases monotonically in this inner profile region 9. The twist in this region is between approximately 4.5° and 2.8°, which can be read from the twist curve 23. In one section, from approximately 16% to 34% of the longitudinal extent 14, the twist curve 23 is designed to be concave, for example, parabolically and/or exponentially decreasing.

The transition profile region 12, for example, can extend from 35% to 50% of the longitudinal extent 14. The profile depth curve 22 is designed to be approximately constant here. The twist curve 23 decreases linearly or has a constant (negative) slope. For example, a twist angle α decreases from 2.8° to 0.8°.

The main profile region 10, for example, extends from 50% to 96% of the longitudinal extent 14. In this region, the profile depth curve 22 continues to decrease monotonically. In a first section of this region, from approximately 50% to 64% of the longitudinal extent 14, the profile depth curve 14 decreases only slightly from, for example, 87% to 82%. From 64% to 96%, the profile depth curve 22 decreases more intensely, from a value of, for example, 82% to 42%.

The planform of the autogyro rotor blade 1 decreases monotonically from the blade root 2 to the blade tip 3 from a maximum profile depth 15 and, at the listed radius positions, has the profile depths listed in the following table 3. The maximum profile depth 15 is normalized to 100% in this case. All other values listed in the table 3 relate to this maximum profile depth. The profile depth 8 decreases, starting from a maximum profile depth, in the direction of the blade tip 3, and therefore, at 60% of the radius, for example, the profile depth 8 is still 85% of the maximum profile depth. Between the radius positions, the planform has uniform transitions and/or extends in a sweeping manner. The profile depth 8 can also be scaled by a factor of 0.8 to 1.2 in order to ideally adapt the planform for the particular design objectives:

TABLE 3

| Radius | Profile depth from | Profile depth to | % of the max depth |
|---|---|---|---|
| 20% | 80% | 120% | 100% |
| 30% | 75.8% | 113% | 94.5% |
| 50% | 69.6% | 104% | 87.0% |
| 60% | 67.9% | 102% | 85.0% |
| 70% | 62.1% | 92.8% | 77.5% |
| 90% | 43.0% | 64.2% | 53.6% |

The twist curve 23 also decreases in the main profile region 10. The value of the twist curve 23 decreases, for example, from 0.8° to −0.5° and has, for example, a parabolically, polynomially, and/or exponentially decreasing curve.

Moreover, the main profile region 10 includes, on the root side, a first subregion 24, in which the twist curve 23 has positive values, in particular positive twist angles α. In addition, the main profile region 10 includes, on the tip side, a second subregion 25, in which the twist curve 23 has negative values, in particular negative twist angles α. A sign change 28 of the twist curve 23 takes place between the first subregion 24 and the second subregion 25 and is situated at approximately 70% of the longitudinal extent of the autogyro rotor blade 1. At an angle of attack of zero degrees, the profile at the point of the sign change 28 is situated in parallel to the plane of rotation of the rotating autogyro rotor blade 1. In the first subregion 24, the local geometric angle of attack is increased by the twist. In the second subregion 25, the geometric angle of attack is decreased, however. These changes in the geometric angle of attack bring about a more favorable downwash distribution, and therefore less turbulence occurs in the wake, whereby the autogyro rotor autorotates more easily, which results in a lower resistance of the autogyro rotor.

The outer profile region 11, which terminates the autogyro rotor blade 1, can be situated between 96% and 100% of the longitudinal extent 14 of the autogyro rotor blade 1. The profile depth curve 22 decreases here parabolically, convexly, polynomially, and/or non-linearly from 42% and approaches zero. The twist curve 23 remains essentially constant in this region.

An autogyro rotor blade 1 having a profile depth curve 22 of this type and a twist curve 23 can be adjusted to special flight requirements in this case. For example, an autogyro rotor blade 1 of this type can permit a high airspeed of the autogyro, since an air resistance is particularly low.

The profile depth curve 22 is designed as a sweeping and/or monotonically decreasing curve in the transition profile region 12 and/or in the main profile region 10. The profile depth curve 22 can also be determined, in this case, by a strictly monotonically decreasing curve.

In addition, the twist curve 23 includes a first sharp bend 26 between the inner profile region 9 and the transition profile region 12 and includes a second sharp bend 27 between the transition profile region 12 and the main profile region 10.

Furthermore, the slope of the twist curve 23 in the transition profile region 12 is at least half as great as in the inner profile region 9 and/or the main profile region 10. In addition, the total twist in the transition profile region 12 is at least half as great as the total twist in the inner profile region 9 and/or the main profile region 10. The total twist in a region is to be defined, in this case, as a difference between the twist curve 23 at the beginning and at the end of a region. For example, the total twist in the transition profile region 12 is approximately 2.0° (2.8°−0.8°).

FIG. 3 shows a cross-section of the profile of the inner profile region 9 (cf. FIG. 2). FIG. 3 is the graphic representation of the table 1 from the preceding description. The profile of the inner profile region 9 is delimited by the leading edge 4, the trailing edge 5, a low pressure side 6, and the high pressure side 7. The low pressure side 6 is curved to a greater extent than the high pressure side 7, and therefore the displacement effect of the profile brings about an acceleration of the surrounding air flow, whereby a corresponding pressure distribution sets in according to Bernoulli's law. This will bring about a lower pressure on the low pressure side than on the high pressure side. This results in a force in the direction of the low pressure side 6, which generates the lift.

The profile depth 8 is normalized to 1 in this FIG. 3, wherein the leading edge 4 in the coordinate system can be situated at 0 and the trailing edge 5 can be situated at 1. The X/c and Y/c values contained in the tables 1, 2 are the corresponding x and y coordinates of the coordinate system, wherein the c in the denominator stands for the profile depth 8 (in order to normalize the coordinates).

The profile thickness 19 is also normalized to the profile depth 8. A relative profile thickness of the autogyro rotor blade 1 is defined as the ratio of the greatest profile thickness 20a and the profile depth 8. For example, the relative profile thickness of the inner profile region 9 is at a relative thickness setback between 25% and 35% and is between 11% and 15%, preferably 13.5%. The relative thickness setback in this case is the ratio of the distance of the greatest profile thickness 20a from the leading edge 4 and the profile depth 8. In this exemplary embodiment, the relative thickness 20a is situated at 29.2%.

In addition, the profile of the inner profile region 9 has a maximum curvature between 3% and 4%, in particular, between 3.6% and 3.8%, given a curvature setback between 30% and 40%, in particular, 35.3%. The maximum curvature in this case is the ratio of the greatest distance between the chord and the camber line. The chord is the connecting line between the leading edge 4 and the trailing edge 5. The camber line lies in the middle between the low pressure side 6 and the high pressure side 7.

When the autogyro rotor blade 1 has a greater profile thickness 19, for example, the lift is increased. With the aid of a profile of this type, a greater load, for example, can be transported by means of the autogyro.

When the profile thickness 19 is less, however, the air resistance of the autogyro rotor blade 1 is decreased. It is then possible to achieve, for example, a higher airspeed and/or a greater range with the autogyro, and therefore the autogyro can be utilized for sports purposes.

Figure 4:
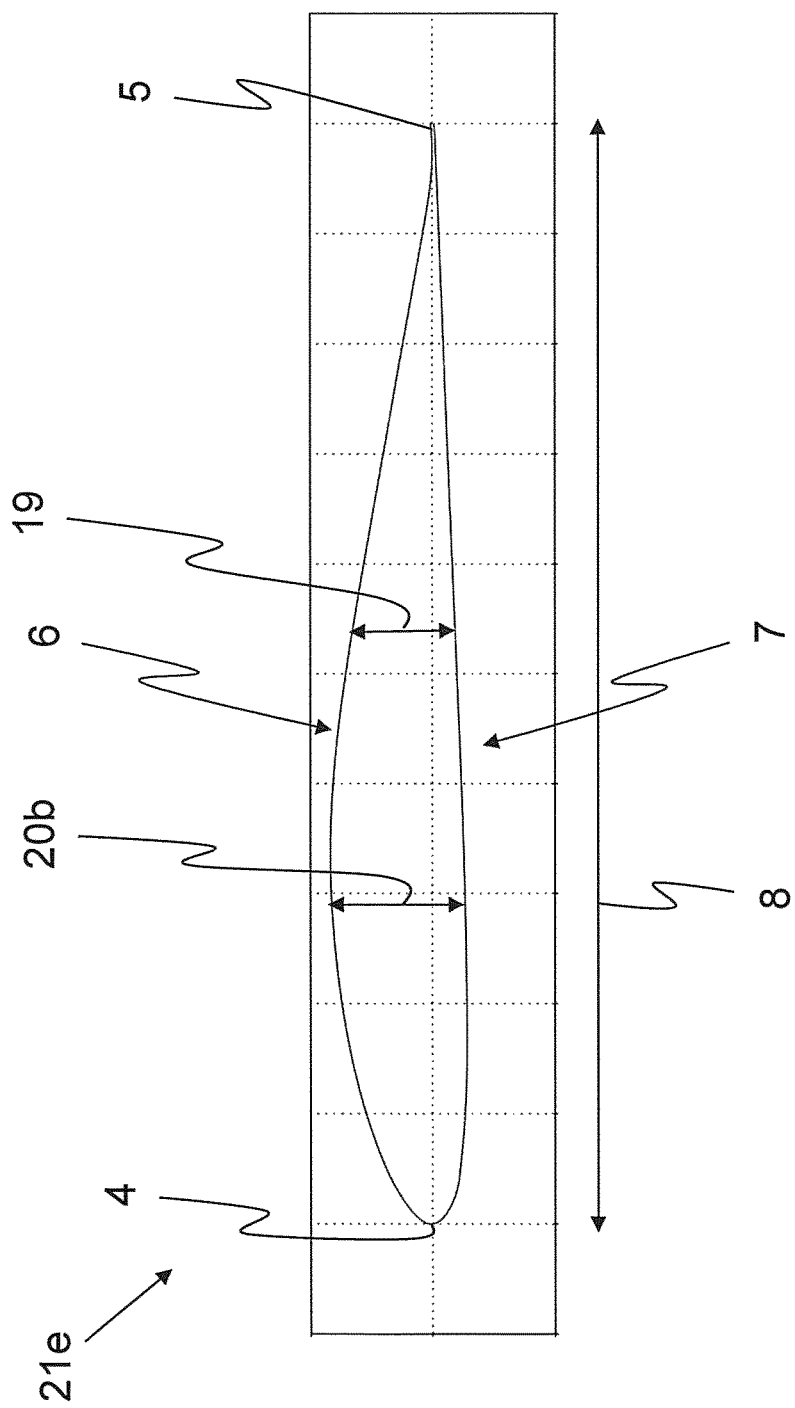
FIG. 4 shows a cross-section of the profile of the main profile region.

FIG. 4 shows a cross-section of the profile of the main profile region 10. FIG. 4 is the graphic representation of the table 2 from the preceding description. In addition, only the differences from the preceding FIG. 3 are to be addressed here. The profile of the main profile region 10 has a relative profile thickness between 10% and 14%, preferably 12.1%, with a relative thickness setback between 26% and 36%, preferably 29.2%. The profile has a greatest profile thickness 20b. In addition, the profile of the main profile region 10 has a maximum curvature between 3% and 4%, in particular, between 3.2% and 3.4%, with a relative curvature setback between 30% and 40%, preferably 36.8%.

The present invention is not limited to the exemplary embodiments that have been shown and described. Modifications within the scope of the claims are also possible, as is any combination of the features, even if they are shown and described in different exemplary embodiments.

LIST OF REFERENCE SIGNS autogyro rotor blade
blade root
blade tip
Leading edge
trailing edge
low pressure side
high pressure side
profile depth
inner profile region
main profile region
outer profile region
first transition profile region
twist
longitudinal extent
range of maximum profile depth
section of the left y-axis
section of the right y-axis
section of the x-axis
profile thickness
greatest profile thickness
profile
profile
first profile
third profile
second profile
profile
profile depth curve
twist curve
first subregion
second subregion
first sharp bend
second sharp bend
sign change
α twist angle

The invention claimed is:

1. An autogyro rotor blade for attachment to a rotor head of an autogyro and generating lift by autorotation thereof, the autogyro blade comprising:
   a blade root configured for being coupled to the rotor head of the autogyro;
   a blade tip spaced apart from the blade root in a longitudinal direction of the autogyro rotor blade;
   a profiled body extending in the longitudinal direction between the blade root and the blade tip;
   a root-side inner profile region which has a first profile that defines the profiled body adjacent the blade root,
   a tip-side main profile region which has a second profile different from the first profile and that defines the profiled body adjacent the blade tip,
   wherein the profiled body defines a profile depth curve which decreases monotonically in the longitudinal direction of the autogyro rotor blade from the blade root in the direction of the blade tip,
   wherein the profiled body defines a twist having a twist curve which decreases monotonically from a region of the blade root in the direction of the blade tip, and the twist curve has a variable slope in at least one of the inner profile region and the main profile region, and the twist curve includes at least one bend along the twist curve, and
   wherein the twist curve has a positive twist angle in a root-side first subregion of the tip-side main profile region and a negative twist angle in a tip side second subregion of the tip-side main profile region and the twist angle between the first subregion and the second subregion is zero.

2. The autogyro rotor blade as in claim 1, wherein the autogyro rotor blade has a transition profile region which is situated between the root-side inner profile region and the tip-side main profile region, wherein a profile geometry of the transition region changes continuously from the root-side inner profile region to the tip-side main profile region.

3. The autogyro rotor blade of claim 2, wherein the twist curve has a constant slope in the transition profile region, and therefore the twist curve is straight across the entire transition profile region.

4. The autogyro rotor blade of claim 2, wherein an absolute value of a slope of the twist curve in the transition profile region is at least half as great as an absolute value of a maximum slope of the twist curve in the root-side inner profile region.

5. The autogyro rotor blade of claim 2, wherein the twist curve has a positive twist angle in the entire root-side inner profile region.

6. The autogyro rotor blade of claim 2, wherein the twist curve includes a first sharp bend during a transition from the root-side inner profile region to the transition profile region and a second sharp bend during the transition from the transition profile region to the tip-side main profile region.

7. The autogyro rotor blade of claim 2, wherein at least one of the transition profile region and the main profile region defines a profile depth curve that is a strictly monotonically decreasing curve.

8. The autogyro rotor blade of claim 2, wherein an absolute value of a slope of the twist curve in the transition profile region is at least half as great as an absolute value of a maximum slope of the twist curve in the main profile region.

9. The autogyro rotor blade of claim 2, wherein an absolute value of an overall twist of the transition profile region is at least half as great as an absolute value of an overall twist of the inner profile region.

10. The autogyro rotor blade of claim 2, wherein an absolute value of a difference of the twist curve at a beginning of the transition profile region and at an end of the transition profile region is at least half as great as an absolute value of a difference of the twist curve at a beginning of the main profile region and at an end of the twist curve of the main profile region.

11. The autogyro rotor blade of claim 2, wherein the twist curve has a positive twist angle in the entire transition region.

12. The autogyro rotor blade of claim 1, wherein the root-side inner profile region has a relative profile thickness between 11% and 15% with a relative thickness setback between 25% and 35%.

13. The autogyro rotor blade of claim 1, wherein the root-side inner profile region has a maximum curvature between 3% and 4%, with a relative curvature setback between 30% and 40%.

14. The autogyro rotor blade of claim 1, wherein the tip-side main profile region has a maximum curvature between 3% and 4%, with a relative curvature setback between 30% and 40%.

15. The autogyro rotor blade of claim 1, wherein the first profile of the root-side inner profile region is designed according to the following table 1,

TABLE 1

| X/c | Y/c |
| --- | --- |
| 0.9999143 | 0.0013778 |
| 0.9096047 | 0.0057740 |
| 0.8094283 | 0.0215009 |
| 0.7018852 | 0.0380422 |
| 0.5942588 | 0.0547910 |
| 0.5069711 | 0.0676497 |
| 0.4086232 | 0.0790094 |
| 0.3009582 | 0.0828136 |

TABLE 1-continued

| X/c | Y/c |
| --- | --- |
| 0.1957930 | 0.0751251 |
| 0.1002021 | 0.0572140 |
| 0.0000021 | −0.0001393 |
| 0.0993147 | −0.0268982 |
| 0.2099724 | −0.0272236 |
| 0.2992137 | −0.0251922 |
| 0.4082850 | −0.0217272 |
| 0.4999015 | −0.0184438 |
| 0.5916794 | −0.0151009 |
| 0.7018578 | −0.0112716 |
| 0.7933965 | −0.0082416 |
| 0.9019589 | −0.0051074 |
| 1.0000250 | −0.0013522 | wherein the X/c coordinates and the Y/c coordinates are normalized to the profile depth, the coordinate origin is at a leading edge, and the values in the table describe, from top to bottom, a profile curve originating from a trailing edge, across a low pressure side to the leading edge, and across a high pressure side back to the trailing edge.

16. The autogyro rotor blade of claim 1, wherein the second profile of the tip-side main profile region is designed according to the following table 2,

TABLE 2

| X/c | Y/c |
| --- | --- |
| 0.9999143 | 0.0015200 |
| 0.9084306 | 0.0066846 |
| 0.7988078 | 0.0244418 |
| 0.7023305 | 0.0398598 |
| 0.6058425 | 0.0553892 |
| 0.4954016 | 0.0718163 |
| 0.4047419 | 0.0813044 |
| 0.3017767 | 0.0832083 |
| 0.1994129 | 0.0743986 |
| 0.1020109 | 0.0551867 |
| 0.0000031 | −0.0001814 |
| 0.0957733 | −0.0261818 |
| 0.2031406 | −0.0278629 |
| 0.2994944 | −0.0263669 |
| 0.3968387 | −0.0235516 |
| 0.4948608 | −0.0200729 |
| 0.6096461 | −0.0157994 |
| 0.7080685 | −0.0121285 |
| 0.8063514 | −0.0085282 |
| 0.9045046 | −0.0051214 |
| 1.0000250 | −0.0014784 | wherein the X/c coordinates and the Y/c coordinates are normalized to the profile depth, the coordinate origin is at a leading edge, and the values in the table describe, from top to bottom, the profile curve originating from a trailing edge, across a low pressure side to the leading edge, and across a high pressure side back to the trailing edge.

17. The autogyro rotor blade as in claim 1, wherein the autogyro rotor blade has a transition profile region which is situated between the root-side inner profile region and the tip-side main profile region, wherein a profile geometry of the transition profile region changes continuously radially outwardly from the root-side inner profile to the tip-side main profile.

18. An autogyro rotor blade for attachment to a rotor head of an autogyro and generating lift by autorotation thereof, the autogyro blade comprising:
 a blade root configured for being coupled to the rotor head of the autogyro;
 a blade tip spaced apart from the blade root in a longitudinal direction of the autogyro rotor blade;

a profiled body extending in the longitudinal direction between the blade root and the blade tip;

a root-side inner profile region which has a first profile that defines the profiled body adjacent the blade root;

a tip-side main profile region which has a second profile different from the first profile and that defines the profiled body adjacent the blade tip;

wherein the profiled body defines a profile depth curve which decreases monotonically in the longitudinal direction of the autogyro rotor blade from the blade root in the direction of the blade tip;

wherein the profiled body defines a twist having a twist curve which decreases monotonically from the region of the blade root in the direction of the blade tip, and the twist curve has a variable slope in at least one of the inner profile region and the main profile region, and the twist curve includes at least one bend along the twist curve; and wherein the autogyro rotor blade includes an outer profile region in a region of the blade tip, and the outer profile region defines a constant twist angle across a length of the outer profile region.

19. An autogyro rotor blade for attachment to a rotor head of an autogyro and generating lift by autorotation thereof, the autogyro blade comprising:

a blade root configured for being coupled to the rotor head of the autogyro;

a blade tip spaced apart from the blade root in a longitudinal direction of the autogyro rotor blade;

a profiled body extending in the longitudinal direction between the blade root and the blade tip;

a root-side inner profile region which has a first profile that defines the profiled body adjacent the blade root;

a tip-side main profile region which has a second profile different from the first profile and that defines the profiled body adjacent the blade tip;

wherein the profiled body defines a profile depth curve which decreases monotonically in the longitudinal direction of the autogyro rotor blade from the blade root in the direction of the blade tip;

wherein the profiled body defines a twist having a twist curve which decreases monotonically from the region of the blade root in the direction of the blade tip, and the twist curve has a variable slope in at least one of the inner profile region and the main profile region, and the twist curve includes at least one bend along the twist curve; and wherein the tip-side main profile region has a relative profile thickness between 10% and 14% with a relative thickness setback between 26% and 36%.

* * * * *